United States Patent
Castelli et al.

[19]

[11] Patent Number: 6,141,445
[45] Date of Patent: Oct. 31, 2000

[54] MULTIRESOLUTION LOSSLESS/LOSSY COMPRESSION AND STORAGE OF DATA FOR EFFICIENT PROCESSING THEREOF

[75] Inventors: Vittorio Castelli, White Plains, N.Y.; Ioannis Kontoyiannis, Mountainview, Calif.; John Timothy Robinson, Yorktown Heights; John J. E. Turek, S. Nyack, both of N.Y.

[73] Assignee: International Business Machines Corporation, Armond, N.Y.

[21] Appl. No.: 09/268,389

[22] Filed: Mar. 15, 1999

Related U.S. Application Data

[63] Continuation of application No. 08/829,457, Mar. 28, 1997.
[51] Int. Cl.[7] .................................................. G06K 9/36
[52] U.S. Cl. ............................................................ 382/232
[58] Field of Search ........................... 382/232, 236, 382/238, 239, 240, 244–247, 248, 250; 358/432, 433; 348/348, 394–395, 400–416, 420, 421, 425, 426, 430, 431, 699

[56] References Cited

U.S. PATENT DOCUMENTS

| | | | |
|---|---|---|---|
| 4,751,742 | 6/1988 | Meeker | 382/240 |
| 4,776,029 | 10/1988 | Shimura | 382/56 |
| 4,903,317 | 2/1990 | Nishihara et al. | 382/56 |
| 4,969,204 | 11/1990 | Melnychuck et al. | 382/240 |
| 5,048,111 | 9/1991 | Jones et al. | 382/240 |
| 5,050,230 | 9/1991 | Jones et al. | 382/240 |
| 5,134,478 | 7/1992 | Golin | 358/136 |
| 5,150,209 | 9/1992 | Baker et al. | 358/133 |
| 5,321,776 | 6/1994 | Shapiro | 382/56 |
| 5,432,871 | 7/1995 | Novik | 382/232 |

FOREIGN PATENT DOCUMENTS

| | | |
|---|---|---|
| 63-131273 | 6/1988 | Japan. |
| 7-226934 | 1/1995 | Japan. |
| 7-240920 | 9/1995 | Japan. |

OTHER PUBLICATIONS

Castelli, V., Li, C–S, Turek, J. and Kontoyiannis, L. "Progressive Classification in the Compressed Domain for Large EOS Satellite Databases," Proceedings of ICASSP 1996, IEEE Conference on Acoustics, Speech & Signal Processing, vol. 4, pp. 2199–2201.

Mallat, Stephane G., "A Theory for Multiresolution Signal Decomposition: The Wavelet Representation," IEEE Transactions on Pattern Analysis and Machine Intelligence, vol. 11, No. 7, pp. 674–693 (Jul. 1989).

*Primary Examiner*—Jose L. Couso
*Attorney, Agent, or Firm*—Wayne L. Ellenbogen, Esq.; Heslin & Rothenberg, P.C.

[57] ABSTRACT

Data representing, for instance, an image is lossily encoded, and a residual of the data is losslessly encoded. The lossily encoded data and the losslessly encoded residual provide a losslessly compressed data representation of the original data. The losslessly compressed data is then organized and stored on a storage system according to one or more criteria selected for the particular losslessly encoded data to be organized. This enables the efficient retrieval and processing of the compressed data, including retrieval of portions of the compressed data.

50 Claims, 6 Drawing Sheets

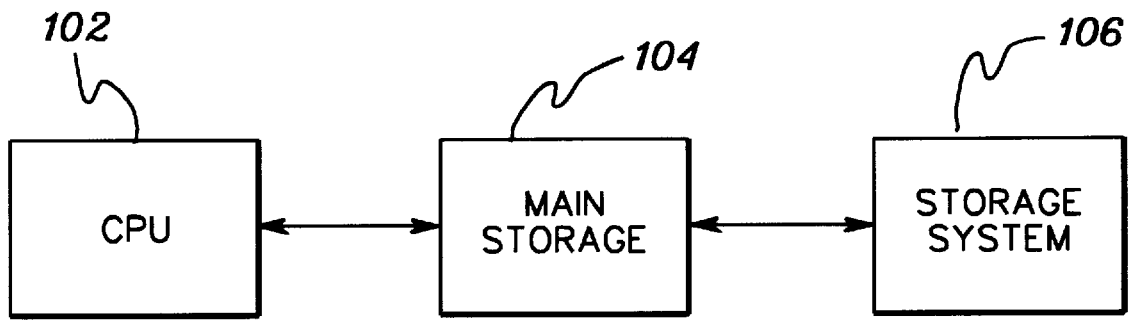
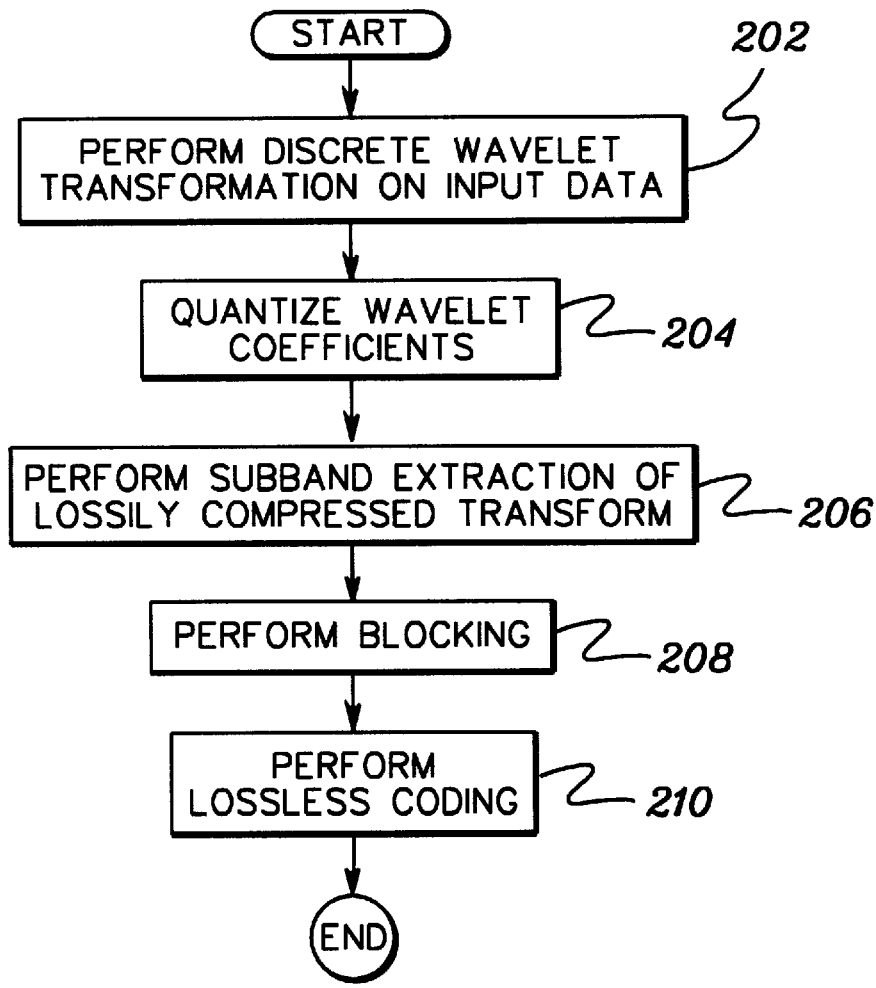

MULTIRESOLUTION LOSSLESS/LOSSY COMPRESSION AND STORAGE OF DATA FOR EFFICIENT PROCESSING THEREOF

CROSS REFERENCE TO RELATED APPLICATION

This application is a continuation of pending U.S. application Ser. No. 08/829,457, filed Mar. 28, 1997, entitled "Multiresolution Lossless/Lossy Compression And Storage Of Data For Efficient Processing Thereof."

STATEMENT AS TO RIGHTS UNDER FEDERALLY SPONSORED RESEARCH

This invention was made with Government support under Contract No. NASA/CAN NCC5-101, awarded by the National Aeronautics and Space Administration. Accordingly, the United States Government has certain rights in the invention.

TECHNICAL FIELD

This invention relates, in general, to data processing and, in particular, to the efficient storage and retrieval of compressed data.

BACKGROUND ART

The effective management, storage and retrieval of data continues to be an important task for any computing environment, especially for those environments which process large amounts of information. A fundamental requirement for the effective management of large databases includes source coding (e.g., compression and decompression) of n-dimensional lattice data in order to more efficiently process and store the data. Lattice data includes, for instance, images, signals, volumetric information, etc.

Typically, a distinction is made between lossless and lossy compression techniques. Lossless techniques allow perfect reconstruction of the original data from the compressed data and lossy techniques only allow for the reconstruction of an approximation to the original data from the compressed data.

Many compression techniques also provide multiresolution versions of an image. For example, a low resolution version of the image is provided for visual browsing, while a high resolution version is provided for a hard copy. One example of such a hybrid coding scheme is described in U.S. Pat. No. 5,050,230, entitled "Hybrid Residual-Based Hierarchical Storage and Display Method for High Resolution Digital Images In A Multiuse Environment," issued on Sep. 12, 1991.

Although techniques are available for providing multiresolution versions of an image, a need still exists for an efficient technique for storing and retrieving compressed data, including multiresolution compressed data. A need also exists for a technique that enables an efficient layout of compressed data, such that selected portions of the data can be efficiently retrieved. A further need exists for a compression and retrieval technique that reduces input/output and seek-time bottlenecks during retrieval of the data.

SUMMARY OF THE INVENTION

The shortcomings of the prior art are overcome and additional advantages are provided through the provision of a method for processing data. Data is lossily encoded and a residual of the data is losslessly encoded, such that losslessly encoded data including the lossily encoded data and the losslessly encoded residual is provided. The losslessly encoded data is organized according to one or more criteria selected for the particular losslessly encoded data to be organized.

In one example, the lossy encoding includes quantizing the data according to at least one specified criterion. The quantization provides a plurality of subbands, which represent the data. In a further embodiment, one of the subbands is blocked providing a plurality of independent blocks for the subband.

In a further example, each of the blocks is separately encoded, such that each block is independently retrievable.

In another embodiment, the losslessly encoding of the residual includes blocking the residual to provide a plurality of independent blocks of the residual, and encoding each of the blocks.

In yet a further embodiment, the lossily encoded data is stored in a searchable database according to one or more selected criteria. The stored data is searched, for instance, by a progressive search technique, for a retrievable portion of the lossily encoded data.

In another embodiment of the invention, the losslessly encoded residual corresponding to the retrievable portion of the lossily encoded data is retrieved, in response to a search hit of the retrievable portion.

In yet a further embodiment, the losslessly encoded data, which is organized according to one or more selected criteria, is stored in at least one database. At least one portion of the stored losslessly encoded data is retrieved. In one example, prior to retrieval, a progressive search is performed for at least one portion to be retrieved.

In another aspect of the present invention, a system for processing data is provided. The system includes means for lossily encoding data and means for losslessly encoding a residual of the data. The lossily encoded data and the losslessly encoded residual represent losslessly encoded data. The system further includes a storage allocator adapted to organize the losslessly encoded data according to one or more criteria selected for the particular losslessly encoded data to be organized.

In yet another aspect of the present invention, an article of manufacture is provided. The article of manufacture includes a computer useable medium having computer readable program code means embodied therein for causing the processing of data. The computer readable program code means in the article of manufacture further includes computer readable program code means for causing a computer to effect lossily encoding the data; computer readable program code means for causing a computer to effect losslessly encoding a residual of the data, wherein losslessly encoded data including the lossily encoded data and the losslessly encoded residual is provided; and computer readable program code means for causing a computer to effect organizing the losslessly encoded data according to one or more criteria selected for the particular losslessly encoded data to be organized.

The present invention advantageously provides for the efficient storage and retrieval of compressed data. Portions of the compressed data can be easily retrieved independently of other portions of the data or the entire data. The speed at which the compressed data can be retrieved is improved. Additionally, a lossy version of the data can be constructed at any level of resolution without requiring the retrieval and decoding of the entire data.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings in which:

FIG. 1 depicts one example of a computer system incorporating and using the storage and retrieval facility of the present invention;

FIG. 2 depicts one example of the logic associated with lossily encoding data, in accordance with the principles of the present invention;

BEST MODE FOR CARRYING OUT THE INVENTION

Figure 3:
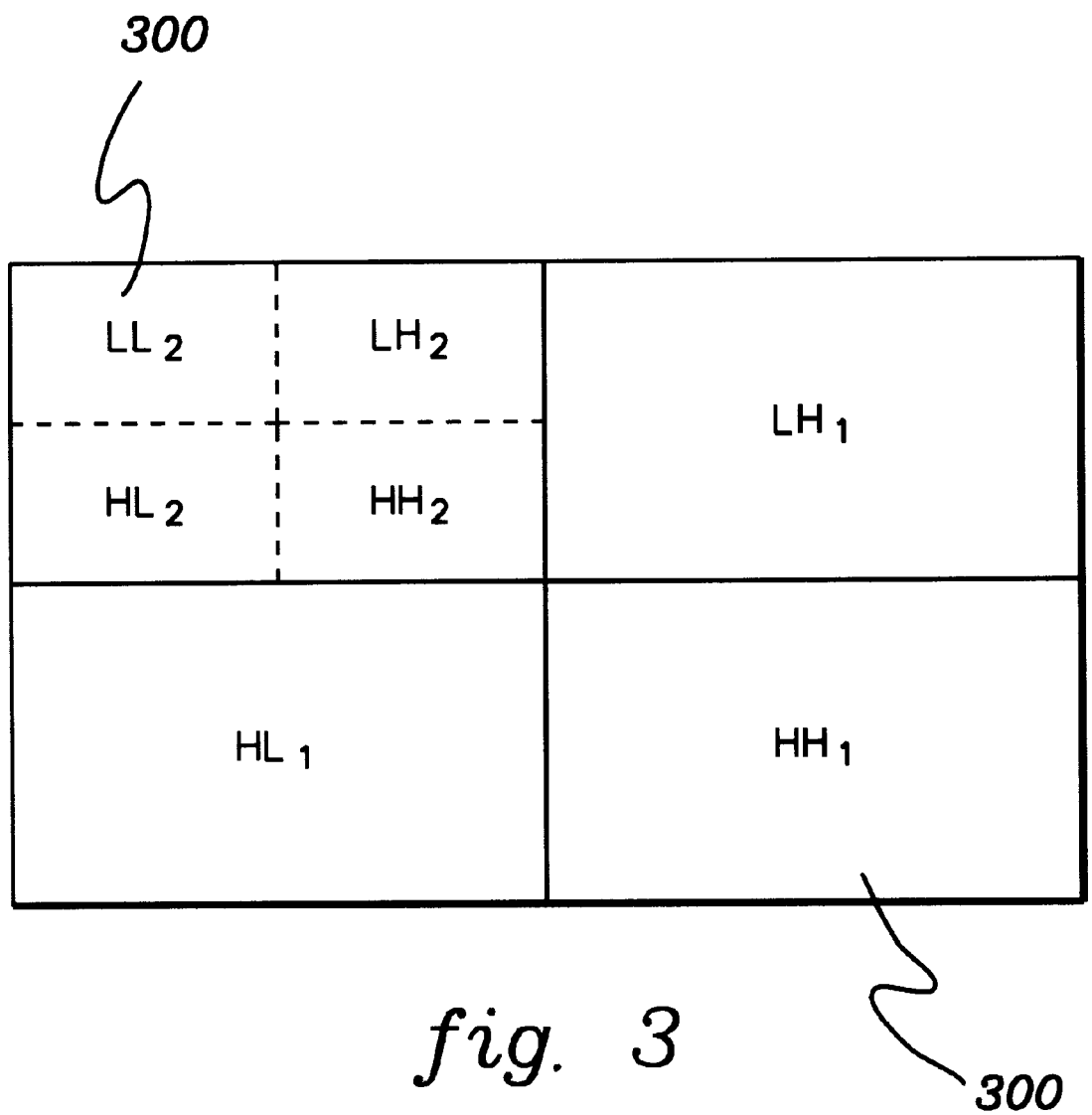
FIG. 3 illustrates a plurality of subbands resulting from a transformation that took place during the lossily encoding of FIG. 2.

In accordance with the principles of the present invention, a technique is provided for the efficient storage and retrieval of compressed data. In particular, lattice data is compressed and the compressed data is stored such that the extraction of one or more portions of the data is efficiently performed. Examples of lattice data include, for instance, images, signals and other types of information, such as volumetric information.

In one embodiment, the storage and retrieval facility of the present invention is incorporated and used in a computing system, such as the one depicted in FIG. 1. Computing system 100 includes, for instance, one or more central processing units 102, a main storage 104 and a storage system 106, each of which is described below.

As is known, central processing unit (CPU) 102 is the controlling center of computing system 100 and provides the sequencing and processing facilities for instruction execution, interruption action, timing functions, initial program loading and other machine related functions. The central processing unit executes at least one operating system, which as known, is used to control the operation of the computer by controlling the execution of other programs, controlling communication with peripheral devices and controlling use of the computer resources. The storage and retrieval facility of the present invention is, in one embodiment, controlled by the operating system, similar to that of other computer programs.

Central processing unit 102 is coupled to main storage 104, which is directly addressable and provides for high speed processing of data by the central processing unit. Main storage may be either physically integrated with the CPU or constructed in stand alone units.

Main storage 104 is also coupled to storage system 106, which includes one or more of a variety of input/output devices, such as, for instance, keyboards, communications controllers, teleprocessing devices, printers, magnetic storage media (e.g., tape, disks), direct access storage devices, and sensor based equipment. Data is transferred from main storage 104 to storage system 106, and from the storage system back to main storage.

One example of computing system 100 incorporating and using the storage and retrieval facility of the present invention is an RS/6000 computer system offered by International Business Machines Corporation. This is only one example, however. The present invention can be used within other computing environments or with other computer systems without departing from the spirit of the present invention.

In accordance with the principles of the present invention, prior to storing the data for later retrieval, the data is compressed, as described in detail below. The data to be compressed is representative of some type of information, such as an image, signals or volumetric information, to name a few examples. Prior to compression, the data is conceptionally in a particular format, such as, for instance, a lattice format. As is known, a lattice is a grid having one or more dimensions.

Figure 4:
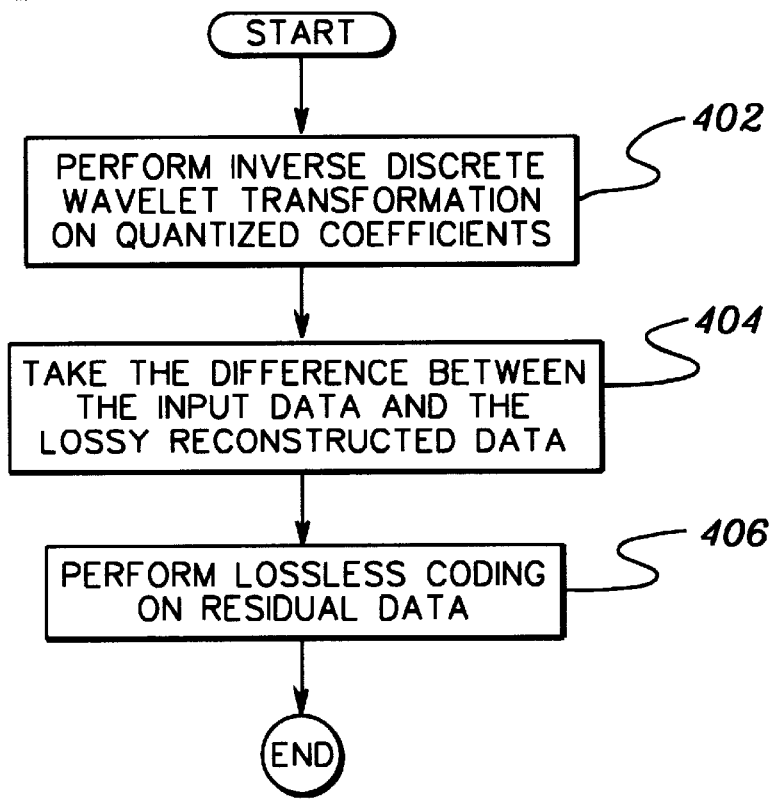
FIG. 4 depicts one example of the logic associated with losslessly encoding a residual of the data lossily encoded in FIG. 2, in accordance with the principles of the present invention.

One example of a technique for compressing data is described below with reference to FIGS. 2–4. In particular, FIG. 2 depicts one embodiment of lossily encoding the data, while FIG. 4 depicts one embodiment of losslessly encoding a residual of the data lossily encoded in FIG. 2.

Referring to FIG. 2, initially, the lattice data, which in this particular embodiment represents an image, is transformed into a multiresolution representation using a transform-based technique, STEP 202. One example of a transform-based technique is Discrete Wavelet Transformation, which takes as input the lattice data provided by a user or a program and produces wavelet coefficients representing a multiresolution decomposition of the input data. The transformation is performed a number of times depending on the number of levels of multiresolution desired. The transformation produces a number of subbands (i.e., portions of the image), which again depends on the number of levels. In the example depicted in FIG. 3, transformation was performed twice (i.e., two levels), resulting in seven subbands. Each subband 300 is depicted as a square within the diagram. Each subband is labeled with two letters. The first corresponds to frequencies in the horizontal direction and the other in the vertical direction. The "L" corresponds to the low pass portion of the spectrum and the "HH" corresponds to the high pass portion.

Discrete Wavelet Transformation is a known technique available in a number of off-the-shelf products, such as the MATLAB Wavelet ToolBox offered by The Math Works; or WaveLab, a free package available from Stamford University. Discrete Wavelet Transformation is also described in "A Theory for Multiresolution Signal Decomposition: The Wavelet Representation," by Stephane G. Mallat, IEEE Trans Pattern Anal Mach Intell, Vol. 11, n. 7, July 1989, p. 674–693, which is hereby incorporated herein by reference in its entirety. Discrete Wavelet Transformation is only one example, however. Any reversible transformation that allows easy retrieval of a multiresolution pyramid without requiring more coefficients than the original data can be used.

Returning to FIG. 2, the output of the transformation is then quantized in order to reduce the number of bits per coefficient of the transformed data, STEP 204. The quantization mechanism selected is based on the transformation technique used. If, for instance, the transform is the wavelet transform, then a larger number of bits is assigned to the lower frequency subbands and a progressively smaller number of bits are assigned to the higher frequency subbands.

If the quantization steps across each subband are equal, then the quantization is referred to as uniform and upper bounds in the approximations to the retrieval operations can be obtained easily. (In another embodiment, a non-uniform quantizer can be used.) In accordance with the principles of the present invention, the number of bits per coefficient, as a function of the subband, is a tunable parameter ($n_O$) that can be adapted to the needs of the specific applications, as described below.

A lower bound is placed on the precision required to allow perfect reconstruction of the data from the quantized coefficients. This lower bound is represented by the following equation:

$$n_L = n_0 + A - B \quad \text{where}$$

$$A = \left\lceil 2L \log_2\left(\frac{GG'}{2}\right) \right\rceil$$

$$B = \lceil \log_2(\epsilon_L) \rceil$$

The number of bits per pixel at level L ($n_L$) is equal to the number of bits per pixel of the original image ($n_O$) plus the value of A minus the value of B. A is equal to the smallest integer which is larger than two times the level (L) in the pyramid times log base 2 of a particular quantity. The particular quantity is equal to half of the product of the sum of the absolute values of the coefficients of the filter used through the transform times the sum of the absolute values of the coefficients of the filter used through the inverse transform. B is equal to the smallest integer which is larger than log base 2 of the maximum error allowed at level L ($\epsilon_L$) (e.g., one-half).

In accordance with the principles of the present invention, the above equation includes a number of tunable parameters, $n_O$, L, $\epsilon_L$, G and G', which are set based upon usefulness criteria selected for the particular image or data by, for instance, a user or dynamically by a program. In accordance with the present invention, different criteria can be used for each input data (i.e., each image or other information) that is to be compressed, stored and/or retrieved. In one embodiment, the usefulness criteria is dependent upon the search and retrieval techniques used for the compressed data. In one example, the search and retrieval techniques used are based on a progressive framework, which is described in further detail below. The usefulness criteria of this embodiment includes a composite criteria including:

1. Allowing to control the error incurred in operating on the lossily compressed image in the progressive framework;
2. Maximizing compression ratio of the losslessly compressed image. Compression ratio is defined as the ratio of the size of the uncompressed image to the size of the compressed image. This is usually expressed as n times larger than the compressed image;
3. Maximizing the visual quality of the lossily compressed product. This criterion corresponds to a metric measuring of the distance between the original image and the lossily compressed image. The metrics are customarily divided in two groups. The first group includes "objective" metrics that can be computed from the original and the lossily compressed image; commonly used metrics are the Mean Squared Error (MSE), the Signal To Noise Ratio (SNR), and the maximum difference. The second group includes "subjective" metrics that measure the difference between the original image and the lossily compressed image as perceived by a human: they are qualitative metrics; and
4. Minimizing the expected access time to the information in the progressive framework.

In accordance with the principles of the present invention, the first three criterion listed above translate into a requirement on the quantizer. The first criterion is met by using a uniform scalar quantizer, as described above, and the second and third criteria are met by choosing the appropriate values for the quantization parameters (e.g., $n_O$, L, $\epsilon_L$, G and G').

For example, it has been observed, in practice, that maximum compression (criterion #2) is achieved when the quantizer performs an aggressive quantization, that is, when it assigns very few bits per pixels to the coefficients of the transform ($n_O$). However, it has also been observed that the visual quality of the lossily compressed image (criterion #3) improves with the number of pixels assigned to the coefficients of the transform. Thus, since the two requirements are in contrast with each other, a trial and error approach is used to determine the best value to use to best satisfy both criteria. One example of a trial and error approach is described in a book by William B. Pennebaker and Joan L. Mitchell, *JPEG: Still Image Data Compression Standard*, Van Nostrand Reinhold, New York, 1993, which is hereby incorporated herein by reference in its entirety.

In addition to setting appropriate values of $n_O$ for each subband, the second and third criterion are met by setting L to 2 and $\epsilon_L$ to ½. G and G' are given by the choice of the transformation technique.

Quantization of the wavelet coefficients produces quantized wavelet coefficients of the transformed data. The quantized wavelet coefficients are then input, in one example, to a subband extraction system, which separates out each of the subbands from the quantized wavelet coefficients prior to encoding, STEP 206. As described above with reference to FIG. 3, in the one specific embodiment depicted, there are seven (7) subbands which are extracted. In one embodiment, these subbands are extracted by finding the submatrices of coefficients corresponding to each subband.

In accordance with the principles of the present invention, the subband extraction system is influenced by one or more of the usefulness criteria. In particular, the design of the subband extraction system is influenced by the criterion requiring maximum compression ratio of the losslessly compressed image and the criterion requiring minimization of the expected access time. In one example, these criteria translate into a requirement of allowing the subband extraction system to randomly access the subbands. The manner in which this is accomplished is described further below with reference to the storage allocation technique of FIG. 5.

Subsequent to extracting the subbands, blocking is performed on any of the subbands deemed to be large, STEP 208. In one embodiment, blocking is performed on each subband that is equal to or greater than 512×512. As is known, blocking includes dividing the subband into a number of approximately same size but smaller pieces. The pieces can then be processed individually allowing for greater processing efficiency. Thus, if the encoding is performed on separate blocks of the image (and the residual) independently, a portion of the image, which is of interest, can be extracted without having to read and decode the entire image. (In another embodiment of the present invention, blocking is not performed.)

Thereafter, each of the subbands (or the blocks that represent the subbands) are encoded to produce a lossily compressed representation of the subbands, STEP 210. In one embodiment, a lossless encoding technique is used to compress the subbands. Examples of lossless encoding techniques include predictive coding (DPCM) followed by fixed-model two pass arithmetic coding or entropy coding, each of which is known in the art. The above encoding techniques are described in detail in the book by William B. Pennebaker and Joan L. Mitchell, *JPEG: Still Image Data Compression Standard,* Van Nostrand Reinhold, New York, 1993, which is hereby incorporated herein by reference in its entirety.

In accordance with the principles of the present invention, the encoder selected also depends on the usefulness criteria. For example, if the weight of criterion number 2 (maximizing compression ratio) is large, then the block size is large and the type of compression technique used is selected at compression time. It is selected, for instance, by applying to the quantized subbands a fixed-to-fixed coder and a fixed-to-variable coder and selecting therefrom the one that compresses the most.

In other embodiments, the block size, quantization tables (i.e., internal tables built based on the parameters) and the type of lossless encoder can be selected automatically at compression time based on the relative weights placed on the usefulness criteria, by, for instance, the user. Other factors may also influence the encoder selection, as described below.

In addition to lossily encoding the data and, in particular, the subbands, the residual resulting from operations within the lossily encoding is losslessly encoded, as described below with reference to FIG. 4. For example, the quantized wavelet coefficients resulting from STEP 204 (FIG. 2) are input to an Inverse Discrete Wavelet Transform to produce a lossy version of the original data, STEP 402. As with the Discrete Wavelet Transformation, Inverse Discrete Wavelet Transformation is only one example. Again, any reversible transformation that allows easy retrieval of a multiresolution pyramid without requiring more coefficients than the original data can be used. The same products that perform Discrete Wavelet Transformation also perform Inverse Discrete Wavelet Transformation.

Subsequent to obtaining the lossy reconstructed lattice data, a pointwise difference between the original data and the lossy approximation of the original data obtained in STEP 402 is taken, STEP 404, in order to produce residual lattice data. The residual lattice data is then compressed using a lossless encoding technique similar to that described above, STEP 406. (In one embodiment, blocking is performed on the residual prior to compressing. As described above, blocking divides the residual into a number of approximately same size but smaller pieces. Each piece can then be independently compressed.) The output of the lossless coding is compressed residual lattice data. The losslessly compressed residual lattice data and the lossily compressed subbands make up the losslessly compressed data of the original image.

Figure 5:
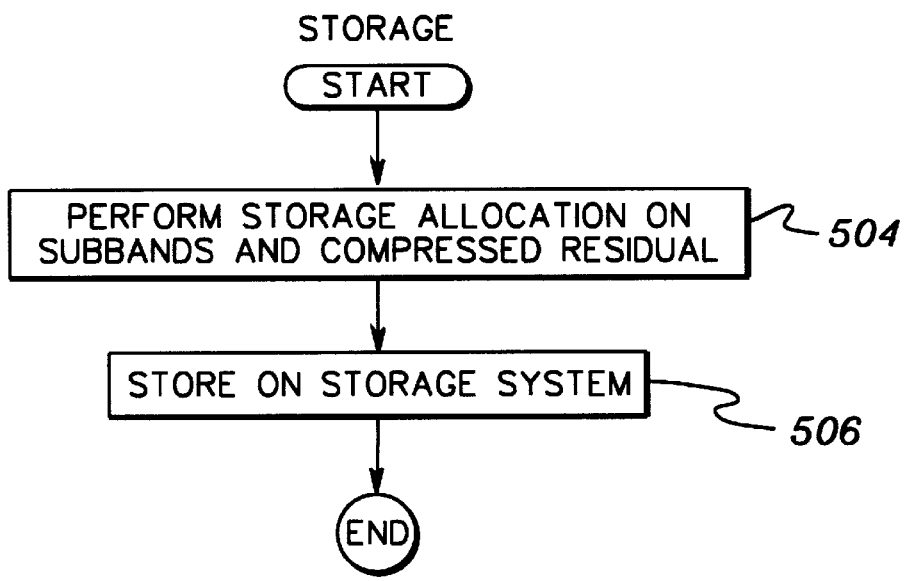
FIG. 5 depicts one example of the logic associated with storing the lossily encoded data and losslessly encoded residual, in accordance with the principles of the present invention.

The losslessly compressed data is stored on a storage system and, in particular, in one or more searchable databases, as described in detail with reference to FIG. 5. In particular, in one embodiment, storage allocation is performed on the subbands (including any blocks of the subbands) and on the losslessly compressed residual (including any blocks of the residual), STEP 504, such that the subbands and the residual can be stored on the storage system for efficient retrieval thereof, STEP 506. Storage allocation depends on the type of storage system as well as the usefulness criteria selected and used.

For example, in one embodiment, the storage system is non-hierarchical and the usefulness criteria requires minimization of the expected access time (#4 above). This criteria translates into a requirement on the storage allocation technique, as well as on the lossless encoder and subband extraction system.

In particular, as one example, statistics gathered on the access pattern to the data (specifically, the lossily encoded data) demonstrates that certain portions of the transform are accessed much more frequently than other portions (i.e., portions of the image are accessed much more frequently than the entire image). Thus, a requirement is made that the frequently accessed portions of the image are stored in such a way that they require minimum access time.

In order to accomplish the above and thus, satisfy the criterion that the expected access time to the information be minimized, the most frequently accessed portions of the image are stored in a bit-sequential fashion at the beginning of the image file (e.g., the beginning of a searchable database). Then, accessing is performed in one seek operation followed by a read operation. The other portions of the transform are stored in such a way that the number of seeks is minimized. Specifically, if the lossless coder is a fixed-to-variable rate coder, such as an entropy encoder, then this requirement is met by storing pointers to the first byte of each stored subband at the header of the file. If, however, the lossless coder is a fixed-to-fixed rate coder, such as a bit-packing encoder, then the pointers are not necessary.

The compressed residual is stored in a manner similar to that of the subbands.

As described above, random access to portions of the compressed image is desirable. To allow random access, the storage allocation technique and the subband extraction system select a strategy that depends on the lossless compression technique. If, for instance, the lossless compression technique is a fixed-to-variable rate coder, the subband extraction system partitions the subbands into fixed-size blocks and then each block is compressed independently, stored in the file, and a pointer to the beginning of the stored block is created to allow access using only one seek operation. If, however, the lossless compression technique is fixed-to-fixed length, then again, the subband extraction system partitions the subbands into fixed-size blocks, each block is compressed independently, and stored in the file, however, it is not necessary to store the pointer to the beginning of the block.

In another embodiment of the invention, the storage system is hierarchical and includes a plurality of storage media (e.g., magnetic disks). In this embodiment, the data that is most frequently requested is stored on the fastest media while the less frequently requested data is stored on the slowest media. For example, the lossily encoded data is typically more frequently requested and thus, would be stored on the fastest media, while the losslessly encoded residual would be stored on the slowest media. Further, those portions of the lossily encoded data that are accessed most frequently would be stored in a manner that reduces seek-time. In a further embodiment, pointers to the losslessly encoded residual would be stored with the lossily encoded data. Thus, if a portion of the lossily encoded data is retrieved, a pointer to the corresponding portion of the losslessly encoded residual would also be retrieved and used to obtain the residual, if desired.

Subsequent to storing the information on the storage system and, in particular, within a searchable database on the storage system, the data (i.e., the lossily encoded data and/or the losslessly encoded residual) can be efficiently searched and retrieved, in accordance with the principles of the present invention. Any search and retrieval techniques can be used in order to search and extract portions of the compressed image or the entire image. However, in one embodiment, a progressive search technique is used to search for a portion of the image or the entire image and a retrieval technique based on a progressive framework is used to retrieve the selected information.

One example of a progressive search technique is described below with reference to FIG. 6. Additional details regarding progressive searching are described in co-pending, commonly assigned U.S. patent application entitled "Progressive Content-Based Retrieval of Image and Video with Adaptive and Iterative Refinement," Ser. No. 08/535,500, Filed Sep. 28, 1995, which is hereby incorporated herein by reference in its entirety.

Figure 6:
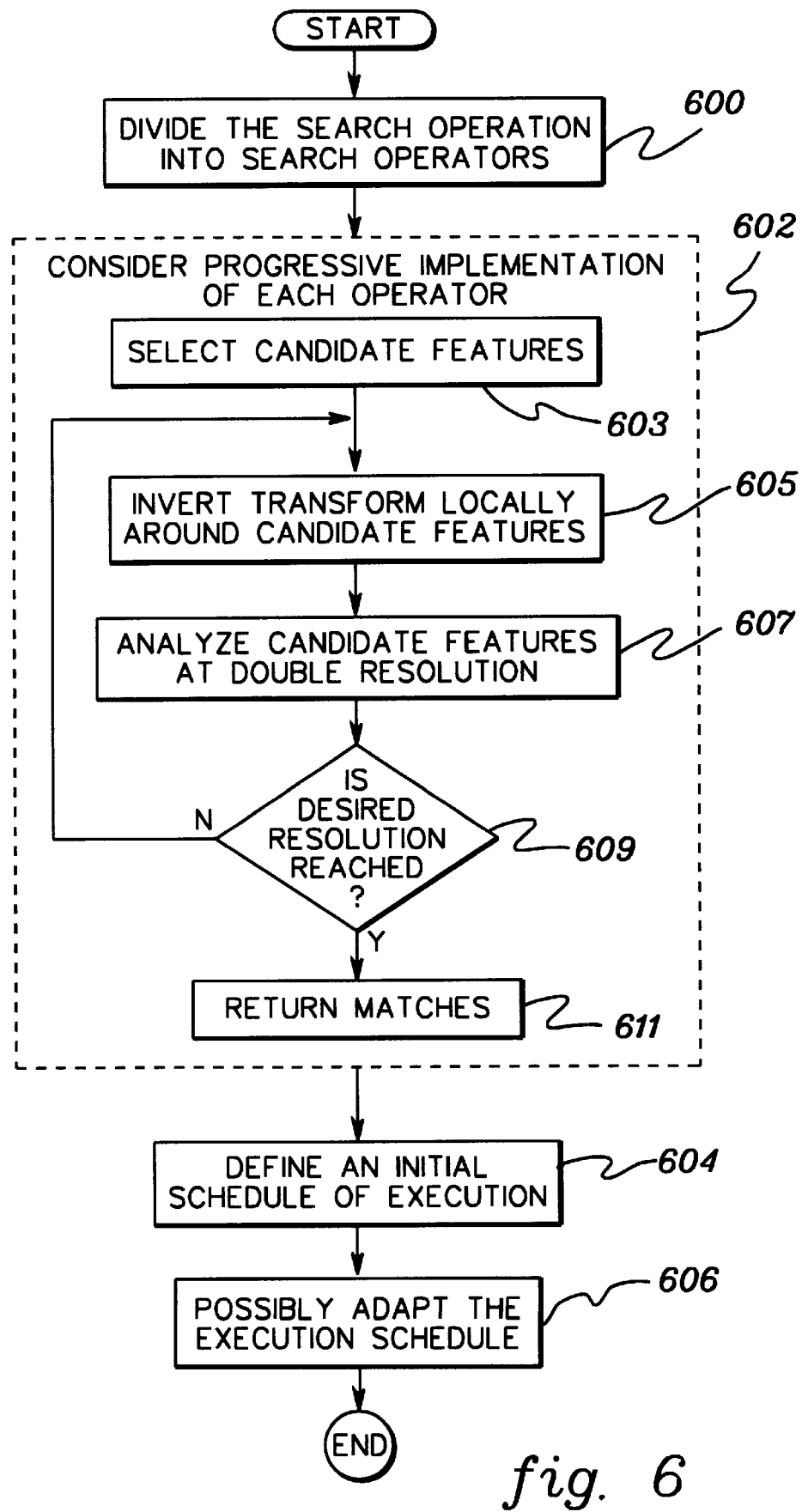
FIG. 6 depicts one example of the logic associated with searching retrievable portions of the compressed data, in accordance with the principles of the present invention.

Referring to FIG. 6, initially, the search query is divided into a number of elementary steps or search operators, STEP 600. For example, a query requesting an indication of all the beaches having beach erosion greater than 100 meters in the last 20 years has a plurality of search operators including, for instance, beaches, erosion greater than 100 meters, and the last 20 years.

In one embodiment, in order to further define a particular search criteria, a classifier is used to represent that criteria. For example, for the search operator beach, a classifier would be used to represent the beach. One example of classification is described in "Progressive Classification in the Compressed Domain for Large EOS Satellite Databases," by Castelli, Chung-Sheng, Turek and Kontoyiannis, Proceedings of ICASSP 1996, IEEE International Conference on Acoustics, Speech and Signal Processing, May 7–10, 1996, Vol. 4, p. 2199, which is hereby incorporated herein by reference in its entirety.

For each elementary operator defined in STEP 600, progressive implementation is considered, STEP 602. Progressive implementation is used to produce more and more accurate results for the search operator using the least amount of data. For instance, initially, candidate features satisfying the particular search operator are selected from the lowest resolution version of the lattice data, STEP 603. Thereafter, the transform locally around the candidate features is inverted using, for instance, an Inverse Discrete Wavelet Transform, in order to double the scale and the resolution of the data, STEP 605. For example, for the search operator greater than 100 meters, candidate features surrounding the beach and the land are selected for further refinement to test whether the erosion is greater than 100 meters. The transform corresponding to these features is inverted in order to double the scale and resolution.

Next, the candidate features are analyzed at the double resolution to determine if they meet the search criteria (e.g., beach erosion greater than 100 meters), STEP 607. Whichever features do not meet the search criteria are discarded. Then, for any features that still are in question, INQUIRY 609, processing returns to STEP 605 "Invert Transform Locally Around Candidate Features." When the desired resolution has been met, the candidate features that have not been discarded are returned, STEP 611.

Subsequent to performing progressive implementation on any of those search operators believed to benefit therefrom, an initial schedule of execution of the search operators is defined such that the user-defined usefulness criteria for the search is best served, STEP 604. For example, if the user-defined search criteria is a combination of retrieval efficiency and accuracy, then execution of the search operators is performed to maximize the criteria.

During execution of the search operators, the execution schedule may be adapted, if it is determined that a better schedule will meet the user-defined usefulness criteria, STEP 606. This adaptation can be based on heuristics (e.g., one or more predefined rules) or based on user feedback on temporary results.

In accordance with the principles of the present invention, elementary steps or operators that are better filters of information are executed earlier than the steps that are poorer filters. The goodness of a filtering operation with respect to the user-defined usefulness criteria can be determined statically (a priori), dynamically (by collecting statistics during usage) or adaptively (by understanding the particular query submitted to the user).

Subsequent to identifying the portion or portions of the compressed data to be retrieved, the selected portions are retrieved from the database(s). As described above, in one embodiment, the search is performed on the lossily encoded data and once the selected portion(s) is retrieved, information stored with the retrieved portion can be used to efficiently retrieve the corresponding losslessly encoded residual. Once the selected information is retrieved, it is decompressed by inversing the above-described steps of compressing the data. The decompressed data is then presented to the user in the manner requested by the user.

Described in detail above is a technique for compressing data and storing the compressed data in such a manner that enables efficient retrieval and processing of selected portions of the compressed data. With the exception of the quantization and lossless encoding operations, all other operations can be performed linearly. This means that if the lossless encoding is performed on separate blocks of the image (and the residual) independently, a portion of the image of interest can be extracted without having to read and decode the entire image. In particular, a lossy version of the image can be reconstructed at any level of resolution by just decoding the blocks that contain wavelet coefficients corresponding to the required portion, and inverting the wavelet transform for these coefficients, only. This provides a significant speedup during the decoding process, since the whole image does not need to be processed, and allows image processing operations to be efficiently applied to reduced resolution image constructs.

Various modifications can be made to the above technique without departing from the spirit of the present invention. For instance, in another embodiment of the invention, subband extraction is not performed on the quantized wavelet coefficients, but instead on the lossily compressed transform after encoding is complete. In this instance, the quantized wavelet coefficients are input to the lossless encoding. Then, after the lossless encoding is performed, resulting in the lossily compressed transform, the lossily compressed transform is input to the subband extraction system. Thereafter, storage allocation of the subbands and the compressed residuals is performed, as described above. In this particular embodiment, blocking is not performed on the subbands, since the encoding has already been completed.

Additionally, various modifications can be made to the usefulness criteria. The criteria described above are only examples. Any other criteria can be used without departing from the spirit of the invention. Additional criteria include, for instance, the following:

A. Speed of decompression of the entire image. This criterion is appropriate when the speed of the decompression is critical for the application. This criterion can be subdivided in two subcriteria, namely:
  i) Speed of decompression of the lossy version of the entire image; and
  ii) Speed of decompression of the lossless version of the entire image.
  In addition, this criterion covers combinations of i) and ii).
B. Speed of decompression of selected portions of the image. This criterion differs significantly from "A" since, especially for large images, a quick decompression of the entire image does not ensure by any means the quick decompression of randomly selected portions. Again, this criterion can be subdivided in two subcriteria, namely:
  i) Speed of decompression of the lossy version of selected portions of the image; and
  ii) Speed of decompression of the lossless version of selected portions of the image.
  In addition, this criterion covers combinations of i) and ii).
C. Speed of retrieval of selected portions of the information. Here, selected portions of the information include not only selected portions of the image, but, for instance, in the case of the wavelet transform, selected portions of the different subbands.
D. Expected speed of retrieval of selected portions of the information as required by a search unit (e.g., a search engine). This criterion differs from "C" in that it minimizes the expected time to access and retrieve the information, where the probability measure used in computing the expectation is induced by the particular search mechanism or criterion used by a search system.
E. Combinations of any of the above criteria described herein. This class of criteria combines any of the criteria described herein by giving different emphasis to the aspects addressed by each of them.

Figure 7A:
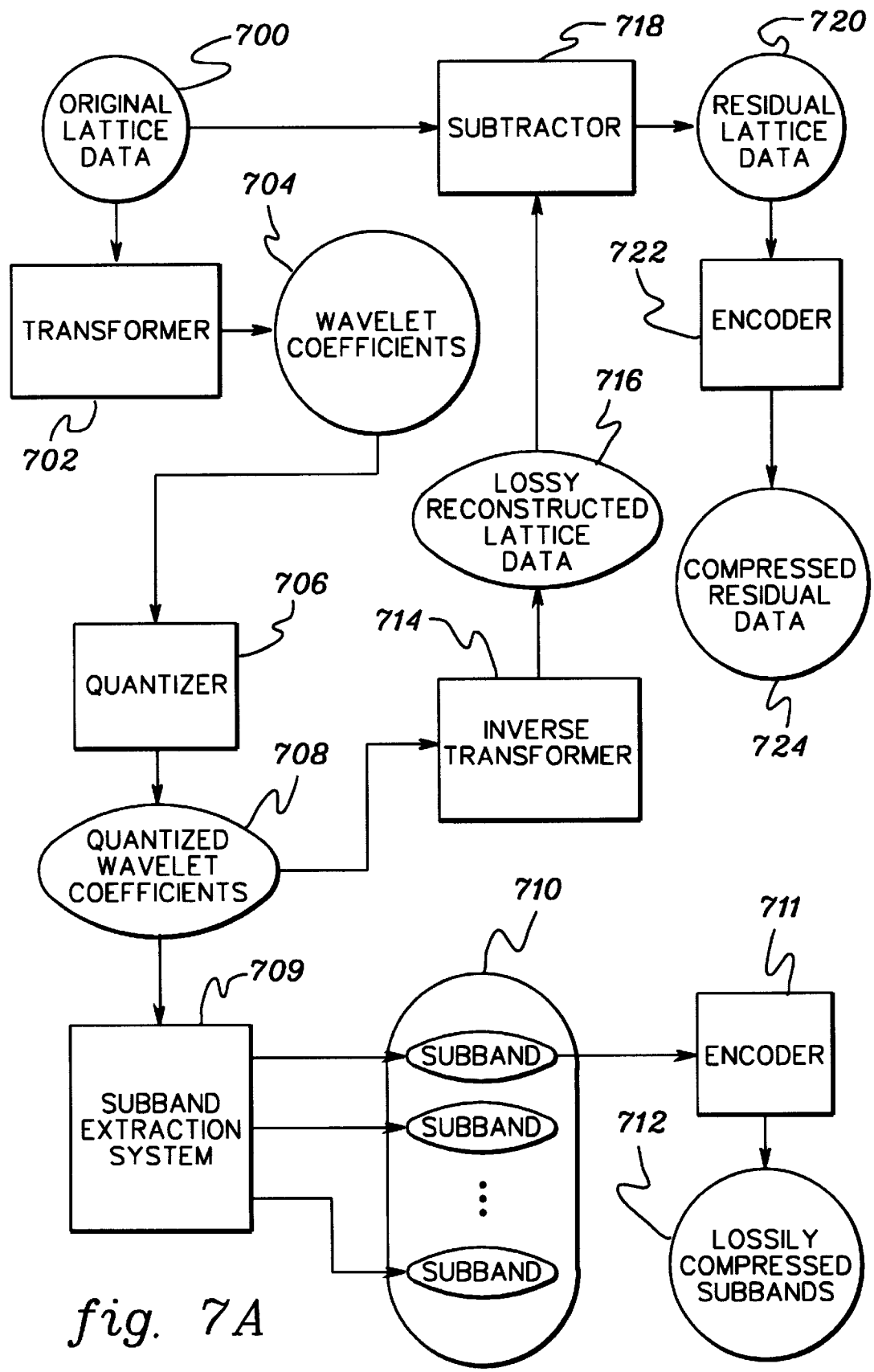
FIGS. 7a–7c depict one embodiment of components used in the storage and retrieval facility of the present invention.
Figure 7B:
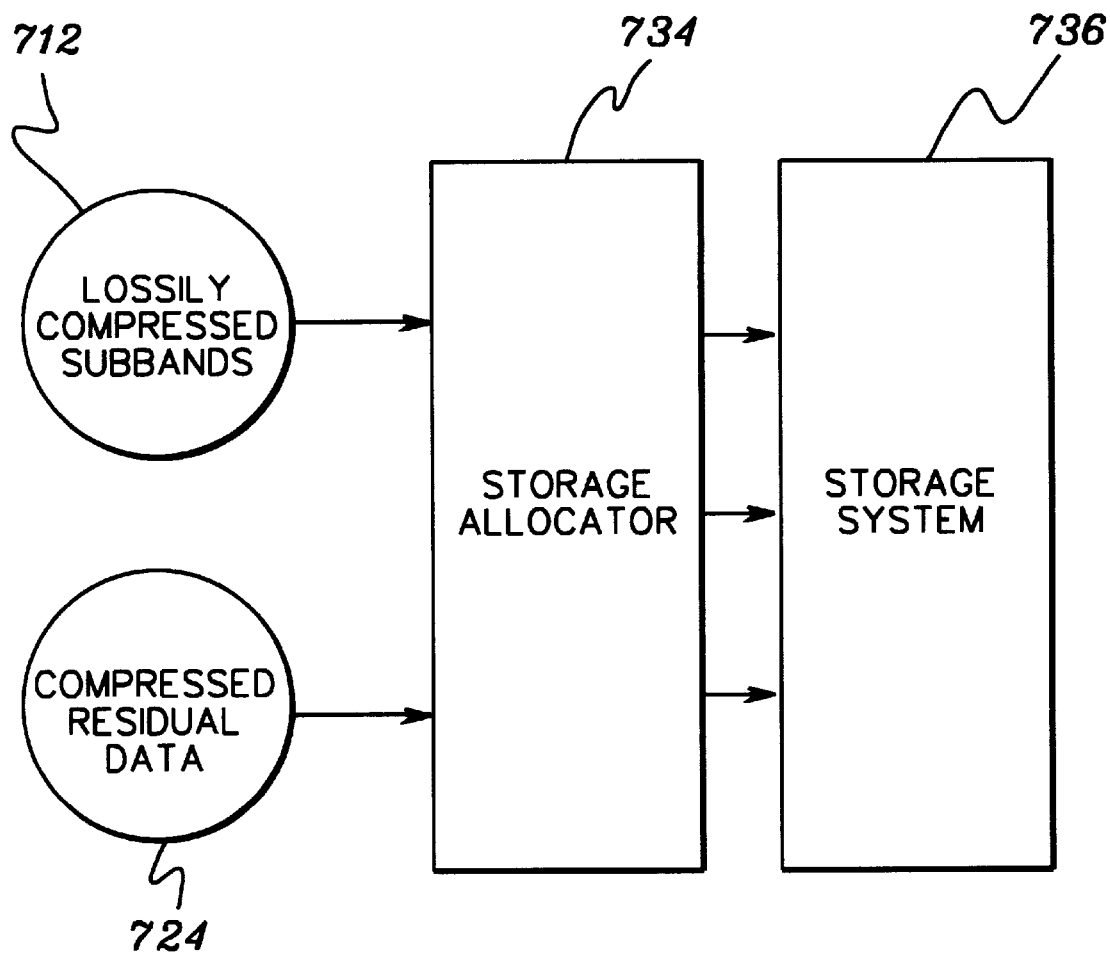
Figure 7C:
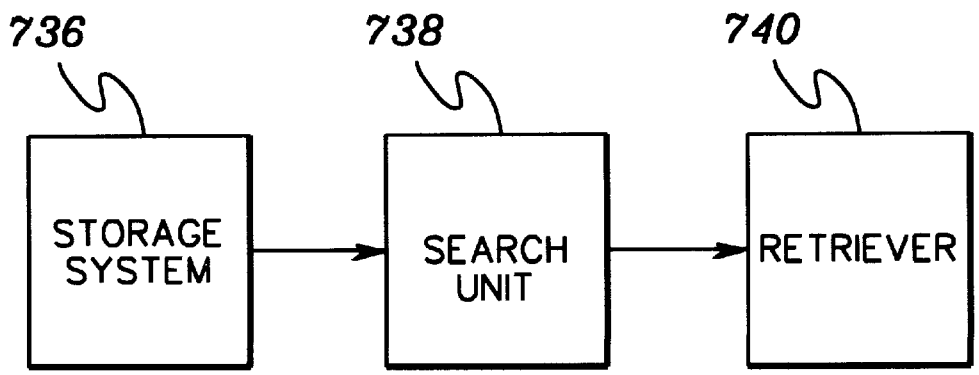

Components for performing the above-described functions are depicted in FIGS. 7a–7c. For ease of understanding, the squares represent the components, while the circles (or ovals) represent input to or output of those components. The original data 700 is input to a transformer 702 used to perform the transformation of STEP 202 (FIG. 2). The output of the transformer is wavelet coefficients 704, which are input to quantizer 706 coupled to transformer 702. Quantizer 706 quantizes the wavelet coefficients, as described above, and the output of the quantizer, the quantized wavelet coefficients 708 are input to a subband extraction system 709 coupled to the quantizer. The output of the subband extraction system, namely subbands 710 (or blocks representing the subbands), is input to encoder 711, which is coupled to subband extraction system 709. The output of the encoder is lossily compressed subbands 712.

Also coupled to quantizer 706 is inverse transformer 714, which receives as input the quantized wavelet coefficients. The inverse transformer produces the lossy reconstructed lattice data 716, which is input to subtractor 718 coupled to inverse transformer 714. The subtractor subtracts the lossy reconstructed data from the original data to produce residual lattice data 720.

The residual lattice data is then input to encoder 722, which is coupled to the subtractor. The output of encoder 722 is compressed residual data 724.

Referring to FIG. 7b, lossily compressed subbands 712 and compressed residual 724 are input to storage allocator 734, which is coupled to encoders 711 and 722. The storage allocator performs allocation on the data and stores the data on storage system 736, as described above.

A search unit 738 (FIG. 7c), coupled to the storage system, searches the storage system for at least a portion of the image stored thereon. When the portion (portions or entire image) is found, a retriever 740, coupled to the search unit, retrieves the selected portion. The selected portion can then be presented to the user in any desired format.

The components described above in FIGS. 7a–7c can be a part of a computer system, can be separate from the system or can be any combination therebetween.

The present invention can be used in a variety of technological fields including, but not limited to, the space technology, data communications, data transmission and video processing.

The present invention can be included in an article of manufacture (e.g., one or more computer program products) having, for instance, computer useable media. The media has embodied therein, for instance, computer readable program code means for providing and facilitating the mechanisms of the present invention. The article of manufacture can be included as part of a computer system or sold separately.

The flow diagrams depicted herein are just exemplary. There may be many variations to these diagrams or the steps (or operations) described therein without departing from the spirit of the invention. For instance, the steps may be performed in a different order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of processing data for a particular application, comprising:
  lossily encoding the data;
  losslessly encoding a residual of said data, wherein losslessly encoded data comprising said lossily encoded data and said losslessly encoded residual is provided; and
  after said lossily encoding and said losslessly encoding, and before decoding thereof, reorganizing said losslessly encoded data according to one or more criteria, said criteria being selected based on said particular application.

2. The method of claim 1, wherein said lossily encoding comprises quantizing said data according to at least one specified criterion.

3. The method of claim 2, wherein said at least one specified criterion comprises one or more of the following criteria:
  maximizing a compression ratio of said losslessly encoded data;
  maximizing a visual quality of said lossily encoded data; and
  allowing control of an error incurred in operating on said lossily encoded data.

4. The method of claim 2, wherein said quantizing provides a plurality of subbands representing said data, and further comprising blocking a subband of said plurality of subbands to provide a plurality of independent blocks of said subband.

5. The method of claim 4, further comprising encoding each block of said plurality of blocks independently, wherein each block is independently retrievable.

6. The method of claim 5, further comprising storing each encoded block of said plurality of blocks independently of one another.

7. The method of claim 6, further comprising retrieving one block of said plurality of blocks.

8. The method of claim 7, wherein said retrieving comprises reconstructing a lossy version of the data of said retrieved block at a desired level of resolution.

9. The method of claim 1, further comprising storing said lossily encoded data in at least one searchable database according to one or more selected criteria.

10. The method of claim 9, further comprising searching said lossily encoded data stored in said searchable database for a retrievable portion of said lossily encoded data.

11. The method of claim 10, wherein said searching comprises progressively searching said lossily encoded data.

12. The method of claim 10, further comprising retrieving said retrievable portion of said lossily encoded data.

13. The method of claim 10, further comprising retrieving at least a portion of said losslessly encoded residual corresponding to said retrievable portion of said lossily encoded data, in response to a search hit of said retrievable portion.

14. The method of claim 9, further comprising storing one or more pointers of said losslessly encoded residual along with said corresponding lossily encoded data.

15. The method of claim 1, wherein said data represents an image.

16. The method of claim 1, further comprising storing said losslessly encoded data, reorganized according to said one or more criteria selected based on said particular application, in at least one database.

17. The method of claim 16, further comprising retrieving at least one portion of said losslessly encoded data stored in said at least one database.

18. The method of claim 17, wherein said retrieving comprises progressively searching for said at least one portion to be retrieved.

19. The method of claim 1, wherein said reorganizing comprises, after said lossily encoding and losslessly encoding, reorganizing said losslessly encoded data for storage on a hierarchical storage system.

20. The method of claim 1, wherein said reorganizing comprises, after said lossily encoding and losslessly encoding, reorganizing said losslessly encoded data according to one or more criteria selected based on an expected usage of said losslessly encoded data.

21. The method of claim 1, wherein said losslessly encoding said residual comprises:
 blocking said residual to provide a plurality of independent blocks of said residual; and
 encoding each block of said plurality of independent blocks.

22. A system of processing data for a particular application, comprising:
 means for lossily encoding the data;
 means for losslessly encoding a residual of said data, wherein losslessly encoded data comprising said lossily encoded data and said losslessly encoded residual is provided; and
 a storage allocator coupled to receive said losslessly encoded data and adapted to reorganize said losslessly encoded data according to one or more criteria selected based on said particular application, said reorganizing occurring prior to decoding of said losslessly encoded data.

23. The system of claim 22, wherein said means for lossily encoding comprises a quantizer adapted to quantize said data according to at least one specified criterion.

24. The system of claim 23, wherein said quantizer provides a plurality of subbands representing said data, and further comprising a subband extraction system adapted to block a subband of said plurality of subbands to provide a plurality of independent blocks of said subband.

25. The system of claim 24, further comprising an encoder adapted to encode each block of said plurality of blocks independently, wherein each block is independently retrievable.

26. The system of claim 25, further comprising a storage system adapted to store each encoded block of said plurality of blocks independently of one another.

27. The system of claim 22, further comprising a storage system adapted to store said lossily encoded data in at least one searchable database according to one or more selected criteria.

28. The system of claim 27, further comprising a search unit to search said lossily encoded data stored in said searchable database for a retrievable portion of said lossily encoded data.

29. The system of claim 28, further comprising a retriever adapted to retrieve at least a portion of said losslessly encoded residual corresponding to said retrievable portion of said lossily encoded data, in response to a search hit of said retrievable portion.

30. The system of claim 22, further comprising at least one database adapted to store said losslessly encoded data, reorganized according to said one or more criteria selected based on said particular application.

31. The system of claim 30, further comprising a retriever adapted to retrieve at least one portion of said losslessly encoded data stored on said at least one database.

32. The system of claim 22, wherein said means for losslessly encoding a residual comprises:
 means for blocking said residual to provide a plurality of independent blocks of said residual; and
 an encoder adapted to encode each block of said plurality of independent blocks.

33. An article of manufacture comprising:
 a computer useable medium having computer readable program code means embodied therein for causing the processing of data for a particular application, the computer readable program code means in said article of manufacture comprising:
 computer readable program code means for causing a computer to effect lossily encoding the data;
 computer readable program code means for causing a computer to effect losslessly encoding a residual of said data, wherein losslessly encoded data comprising said lossily encoded data and said losslessly encoded residual is provided; and
 computer readable program code means for causing a computer to effect, after said lossily encoding and losslessly encoding, and before decoding thereof, reorganizing said losslessly encoded data according to one or more criteria selected based on said particular application.

34. The article of manufacture of claim 33, wherein said computer readable program code means for causing a computer to effect said lossily encoding comprises computer readable program code means for causing a computer to effect quantizing said data according to at least one specified criterion.

35. The article of manufacture of claim 34, wherein said quantizing provides a plurality of subbands representing said data, and further comprising computer readable program code means for causing a computer to effect blocking a subband of said plurality of subbands to provide a plurality of independent blocks of said subband.

36. The article of manufacture of claim 35, further comprising computer readable program code means for causing a computer to effect encoding each block of said plurality of blocks independently, wherein each block is independently retrievable.

37. The article of manufacture of claim 36, further comprising computer readable program code means for causing a computer to effect storing each block of said plurality of blocks independently of one another.

38. The article of manufacture of claim 33, further comprising computer readable program code means for causing a computer to effect storing said lossily encoded data in at least one searchable database according to one or more selected criteria.

39. The article of manufacture of claim 38, further comprising computer readable program code means for causing a computer to effect searching said lossily encoded data stored in said searchable database for a retrievable portion of said lossily encoded data.

40. The article of manufacture of claim 39, further comprising computer readable program code means for causing a computer to effect retrieving at least a portion of said losslessly encoded residual corresponding to said retrievable portion of said lossily encoded data, in response to a search hit of said retrievable portion.

41. The article of manufacture of claim 38, further comprising computer readable program code means for causing a computer to effect storing one or more pointers of said losslessly encoded residual along with said corresponding lossily encoded data.

42. The article of manufacture of claim 33, further comprising computer readable program code means for causing a computer to effect storing said losslessly encoded data, reorganized according to said one or more criteria selected based on said particular application, in at least one database.

43. The article of manufacture of claim 42, further comprising computer readable program code means for causing a computer to effect retrieving at least one portion of said losslessly encoded data stored in said at least one database.

44. The article of manufacture of claim 33, wherein said computer readable program code means for causing a computer to effect reorganizing comprises computer readable program code means for causing a computer to effect, after said lossily encoding and losslessly encoding, reorganizing said losslessly encoded data for storage on a hierarchical storage system.

45. The method of claim 1, wherein said reorganizing of said losslessly encoded data comprises reorganizing all of said losslessly encoded data according to said one or more criteria selected based on said particular application.

46. The method of claim 1, wherein said reorganizing comprises reorganizing said losslessly encoded data according to said one or more criteria selected based on said particular application, wherein said criteria is independent of a result of said lossily encoding and a result of said losslessly encoding.

47. The system of claim 22, wherein said storage allocator is adapted to reorganize all of said losslessly encoded data according to said one or more criteria selected based on said particular application.

48. The system of claim 22, wherein said storage allocator is adapted to reorganize said losslessly encoded data according to said one or more criteria selected based on said particular application, wherein said criteria is independent of said means for lossily encoding and said means for losslessly encoding.

49. The article of manufacture of claim 33, wherein said computer readable program code means for causing a computer to effect reorganizing said losslessly encoded data comprises computer readable program code means for causing a computer to effect reorganizing all of said losslessly encoded data according to said one or more criteria selected based on said particular application.

50. The article of manufacture of claim 33, wherein said computer readable program code means for causing a computer to effect reorganizing comprises computer readable program code means for causing a computer to effect reorganizing said losslessly encoded data according to said one or more criteria selected based on said particular application, and wherein said criteria is independent of said lossily encoding the data and said losslessly encoding a residual of said data.

* * * * *

UNITED STATES PATENT AND TRADEMARK OFFICE
CERTIFICATE OF CORRECTION

PATENT NO. : 6,141,445
DATED : October 31, 2000
INVENTOR(S) : Castelli et al.

It is certified that error appears in the above-identified patent and that said Letters Patent are hereby corrected as shown below:

Column 4, line 52 after "the" delete "HH" and insert - -"H"- -

Signed and Sealed this

Eighth Day of May, 2001

Attest:

NICHOLAS P. GODICI

Attesting Officer     Acting Director of the United States Patent and Trademark Office